(12) United States Patent
Nietlispach

(10) Patent No.: US 7,249,647 B2
(45) Date of Patent: Jul. 31, 2007

(54) SNOWMOBILE STEERING AND SUSPENSION FOR IMPROVED PERFORMANCE IN TURNS

(76) Inventor: Peter Nietlispach, R.R. #3, Durham, Ontario (CA) N0G 1R0

( * ) Notice: Subject to any disclaimer, the term of this patent is extended or adjusted under 35 U.S.C. 154(b) by 103 days.

(21) Appl. No.: 10/986,361

(22) Filed: Nov. 12, 2004

(65) Prior Publication Data
US 2006/0070781 A1    Apr. 6, 2006

(30) Foreign Application Priority Data
Oct. 1, 2004    (CA) .................................. 2483670

(51) Int. Cl.
B62M 27/02    (2006.01)

(52) U.S. Cl. ................. 180/190; 180/184; 180/182; 180/186; 180/9.25; 280/16; 280/21.1; 280/25; 280/26; 280/124.135

(58) Field of Classification Search ............... 180/9.1, 180/9.21, 9.25, 9.44, 9.5, 9.54, 190, 182
See application file for complete search history.

(56) References Cited
U.S. PATENT DOCUMENTS

| | | | |
|---|---|---|---|
| 3,613,812 A | 10/1971 | Hetteen | 180/5 R |
| 3,664,446 A | 5/1972 | Burtis et al. | 180/5 R |
| 3,724,578 A | 4/1973 | Erickson | 180/5 R |
| 3,734,219 A | 5/1973 | Christensen et al. | 180/5 R |
| 3,809,172 A | 5/1974 | Hendrickson et al. | 180/5 R |
| 3,827,516 A | 8/1974 | Lucia | 180/5 R |
| 3,835,947 A | 9/1974 | Alexander, Jr. | 180/5 R |
| 4,671,521 A | 6/1987 | Talbot et al. | 280/16 |
| 5,029,664 A | 7/1991 | Zulawski | 180/190 |
| 6,125,958 A * | 10/2000 | Olson et al. | 180/182 |
| 6,199,649 B1 | 3/2001 | Alanko | 180/190 |
| 6,234,262 B1 | 5/2001 | Moore | 180/182 |
| 6,260,648 B1 | 7/2001 | Bessette | 180/184 |
| 6,431,561 B1 | 8/2002 | Hedlund | 280/28 |
| 6,976,550 B2 * | 12/2005 | Vaisanen | 180/190 |
| 2002/0175013 A1 | 11/2002 | Karpik | 180/182 |

* cited by examiner

Primary Examiner—Lesley D. Morris
Assistant Examiner—Maurice Williams
(74) Attorney, Agent, or Firm—Ivor M. Hughes; Barrister & Solicitor

(57) ABSTRACT

A snowmobile steering mechanism adapted to place higher pressure on the outside ski than on the inside ski when the snowmobile enters and exits turns, said steering mechanism being adapted to include the suspension in the steering action of the snowmobile causing the snowmobile to automatically lean into a turn improving the ability of the snowmobile to enter and exit turns in comparison to a snowmobile without the inclusion of the suspension in the steering action of the snowmobile.

4 Claims, 7 Drawing Sheets

SNOWMOBILE STEERING AND SUSPENSION FOR IMPROVED PERFORMANCE IN TURNS

FIELD OF THE INVENTION

This invention relates to snowmobile steering and suspensions and a kit to convert existing snowmobiles to realize improved performance in turns.

BACKGROUND OF THE INVENTION

Snowmobiles are well known and have been used for many years. Improvements have been made to snowmobiles through various innovations as described in the patent literature. Improvements to steering and suspension have also been realized. Negotiating turns for snowmobile operators is always a concern as the snowmobile sled might be over turned if the turn is negotiated at a higher speed, particular if the operator has not learned to lean into the turn which is dependent on ones physical dexterity.

Applicant is aware of the following literature which as been reviewed in view of the present invention which is considered as prior art.

U.S. Pat. No. 3,827,516 issued Aug. 6, 1974 to Lucia describes a mechanism for combining steering and tilt control of the skis, when the turning movement of the skis is provided through the rotation of two substantially vertical king pins as shown in the illustrations.

U.S. Pat. No. 3,613,812 issued Oct. 19, 1971 to Hetteen describes a snowmobile which includes a spindle connected to each ski through a spring mechanism including springs and a shock absorber as seen in FIG. 4.

U.S. Pat. No. 3,724,578 permits a ski to be rotated on a horizontal plane to guide the snowmobile, about pin 24 in an essentially vertically plane to compensate for terrain irregularities. The patent includes the leaf spring arrangement to provide for terrain irregularities.

U.S. Pat. No. 5,029,664 issued Jul. 9, 1991 to Zulawski teaches a suspension system for skis of a snowmobile which includes an arrangement for controlling movement of steering point of each respective ski.

U.S. Pat. No. 3,835,947 describes and teaches an anti-roll torsion bar stabilizing system for a snowmobile.

U.S. Patent application 2002/0175013 published Nov. 28, 2002 describes a complex suspension system for a snowmobile assembly.

U.S. Pat. No. 3,664,446 issued May 23, 1972 to Burtis teaches an articulating snowmobile vehicle.

U.S. Pat. No. 3,809,172 issued May 7, 1974 to Hendrickson purports to teach mounting of a shock absorber arrangement.

U.S. Pat. No. 3,734,219 issued May 22, 1973 to Christenscen teaches a steering system for a snowmobile to lessen the stabilizing forces acting ahead of the center of gravity of such snowmobile.

U.S. Pat. No. 4,671,521 teaches a snowmobile ski suspension including the steering arrangement for skis.

U.S. Pat. No. 6,260,648 issued Jul. 13, 2001 to Sette teaches a system for engaging the steering rod to a steering gear in a steerable vehicle or a snowmobile.

U.S. Pat. No. 6,234,262 issued May 27, 2001 to Moore teaches a snowmobile steering and suspension mechanism as seen in relation to FIG. 2 which incorporates as best seen in FIG. 8 with the use of a trailing brace arm, which includes a frame and shock absorbers and fixed length tie rods to trailing brace arms extending between the snowmobile frame and a pair of skis and the conventional steering spindle on each set of skis for effecting the steering action of the handle bar. The shock absorbers are connected between the frame and the trailing brace arms, which causes the skis in turn to shift the weight of the snowmobile towards the inside of a turn. The teachings of this reference therefore point in an opposite direction with respect to applicant's invention. The purpose of applicants invention is to impart a higher force on the outside ski when negotiating a turn.

Nowhere in the prior art is there found, within the patent literature to the best of applicant's knowledge a snowmobile assembly or a kit of components to convert the steering action of a snowmobile assembly to allow for increased pressure on the outside ski when negotiating turn.

However, in spite of the general discussions in the above-mentioned patent literature there is no discussion of the present problems facing the snowmobile enthusiast when negotiating turns.

It is therefore a primary object of this invention to provide improvements in snowmobile steering resulting in performance enhancement of the snowmobile when negotiating turns.

It is a further object of this invention to provide a kit of components which may be installed on existing snowmobiles to realize the improvement in turning performance of the steering and suspension thereof.

Further and other objects of the invention may become apparent to those skilled in the art when considering the following summary of the invention and a more detailed description of the preferred embodiments illustrated herein.

SUMMARY OF THE INVENTION

According to a primary aspect of the invention there is provided a snowmobile having a steering mechanism and a suspension, said steering mechanism, being operably connected to a linkage system for synchronized engagement with the steering spindle of each ski and to provide the steering motion of each ski about a pivot point connected to said spindle when the steering mechanism is operated from side to sides, the suspension being normally attached to the frame to provide for suspension of said snowmobile as it traverses rough terrain;

the improvement comprising adaptation of said steering mechanism to include the suspension in the steering action of said snowmobile thereby including not only the steering motion of said skis when the steering mechanism is operated but also imparting a vertical element to the motion of said skis during steering, while maintaining the normal suspension characteristics of the snowmobile, said improvement being most evident when turning the snowmobile in a predetermined direction wherein when the snowmobile enters a turn the resulting pressure on the outside ski is higher in magnitude than on the inside ski causing the snowmobile to automatically lean into a turn improving the ability of the snowmobile to enter and exit turns in comparison to a snowmobile without the inclusion of the suspension in the steering action of the snowmobile.

According to yet another aspect of the invention there is provided a snowmobile steering mechanism adapted to place higher pressure on the outside ski than on the inside ski when the snowmobile enters and exits turns, said steering mechanism being adapted to include the suspension in the steering action of the snowmobile causing the snowmobile to automatically lean into a turn improving the ability of the snowmobile to enter and exit turns in comparison to a snowmobile without the inclusion of the suspension in the steering action of the snowmobile.

According to further aspect of the invention there is provided a kit of components to modify a snowmobile steering mechanism to place higher pressure on the outside ski than on the inside ski when the snowmobile enters and exits turns, said steering mechanism being adapted to include the suspension in the steering action of the snowmobile causing the snowmobile to automatically lean into a turn improving the ability of the snowmobile to enter and exit turns in comparison to a snowmobile without the inclusion of the suspension in the steering action of the snowmobile.

In one embodiment said steering mechanism is an operator accessible handle.

Preferably said suspension includes a shock absorber and a spring.

In a preferred embodiment the adaptation of said steering mechanism includes pivoting and supporting a rotatable link from a frame support used to normally mount a concentric shock and spring and said link for mounting the upper mount of said shock absorber and spring a predetermined distance from said frame support, wherein the motion of said rotatable link resulting from the snowmobile entering and exiting turns will move the upper mount sufficiently to effect a tensile force on the outside shock and spring and similarly a compressive force on the inside shock and spring and thereby place higher pressure on the outside ski than on the inside ski. Preferably the rotatable link is also connected at the end remote said upper mount to a steering linkage operably connected to said steering mechanism for synchronized motion of both skis.

In yet another embodiment of the invention the steering mechanism may further comprise a sector attached to each vertical steering pivot post imparting the steering action to the skis, each sector also being attached to a synchronizing member to co-ordinate the steering action of the skis, the sector adjacent the steering link also being attached thereto, said synchronizing member also being attached to one end of a pivoting link, the other end of said link being engaged with a crank proximate one end of said crank which is pivotably mounted to the shock mounting point of said frame, the concentric shock/spring being mounted to the opposite end of said crank, and being engaged with the steering spindle proximate the other end thereof, wherein the installation of said kit of component provides for the pressure difference on the inside and outside skis when the snowmobile is negotiating a turn.

In a further embodiment of the invention the kit of components may further comprise a sector attached to each vertical steering pivot post imparting the steering action to the skis, each sector also being attached to a synchronizing member to co-ordinate the steering action of the skis, the sector adjacent the steering link also being attached thereto, said synchronizing member also being attached to one end of a pivoting link, the other end of said link being engaged with a crank proximate one end of said crank which is pivotably mounted to the shock mounting point of said frame, the concentric shock/spring being mounted to the opposite end of said crank, and being engaged with the steering spindle proximate the other end thereof, wherein the installation of said kit of component provides for the pressure difference on the inside and outside skis when the snowmobile is negotiating a turn.

The invention may also be adapted effectively for automobiles, trucks, all terrain vehicles and other four wheeled vehicles.

DETAILED DESCRIPTION OF THE PREFERRED EMBODIMENTS

Figure 1:
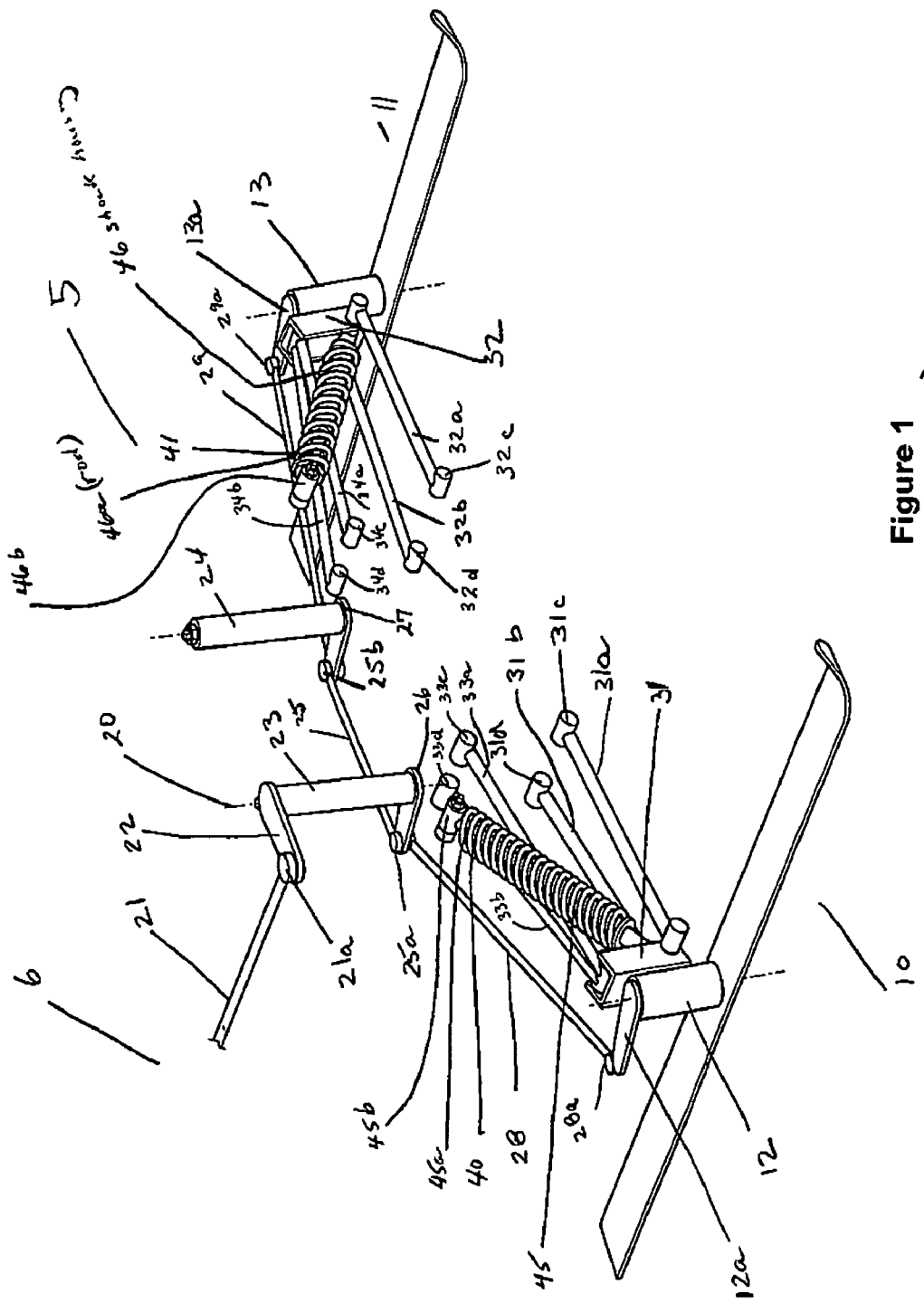
FIG. 1 is schematic perspective views of the suspension and steering mechanism for an Arctic Cat® suspension and steering mechanism shown as prior art to the present invention.
Figure 2:
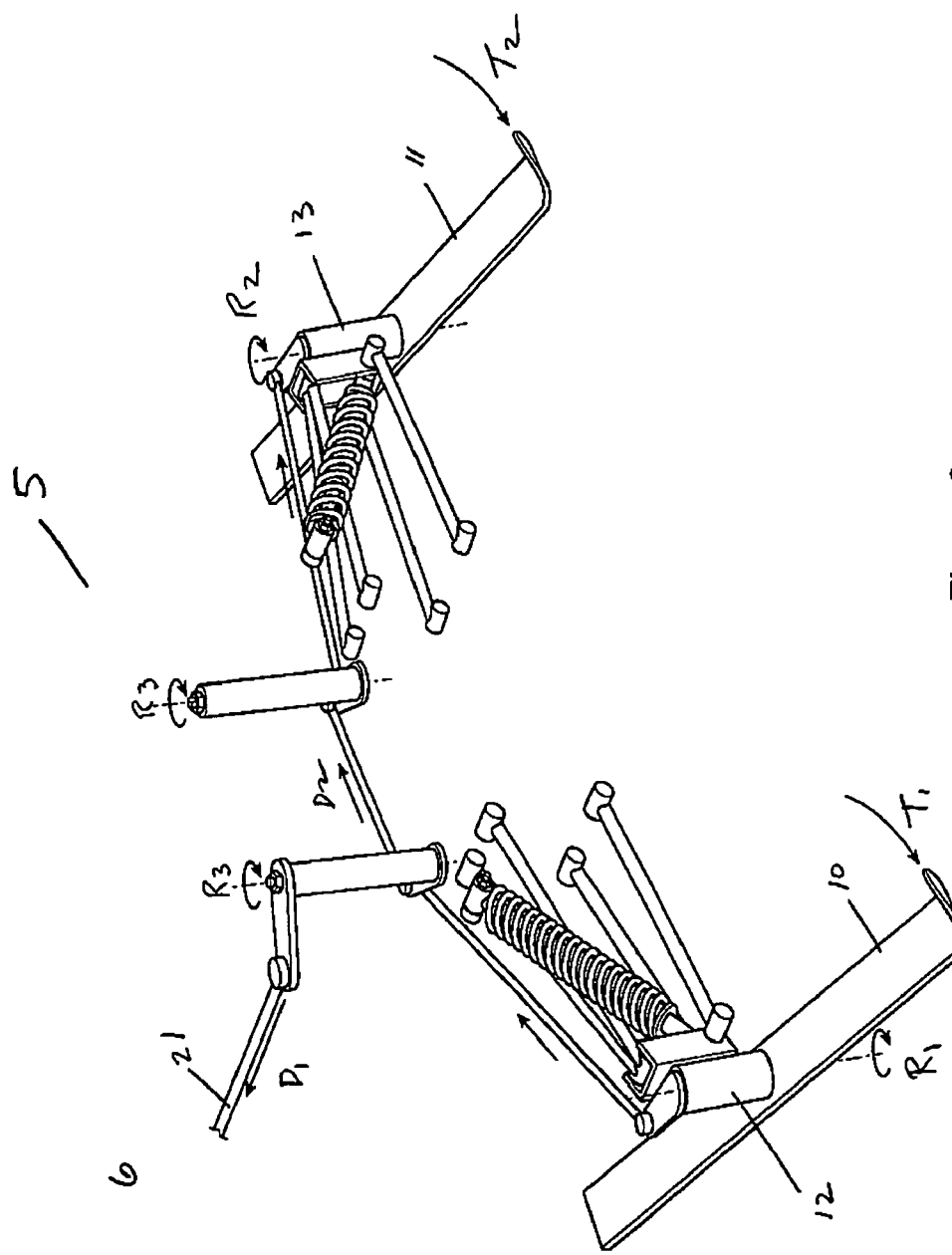
FIG. 2 is another schematic perspective view of FIG. 1 illustrating the steering action thereof and prior art to the present invention.
Figure 3:
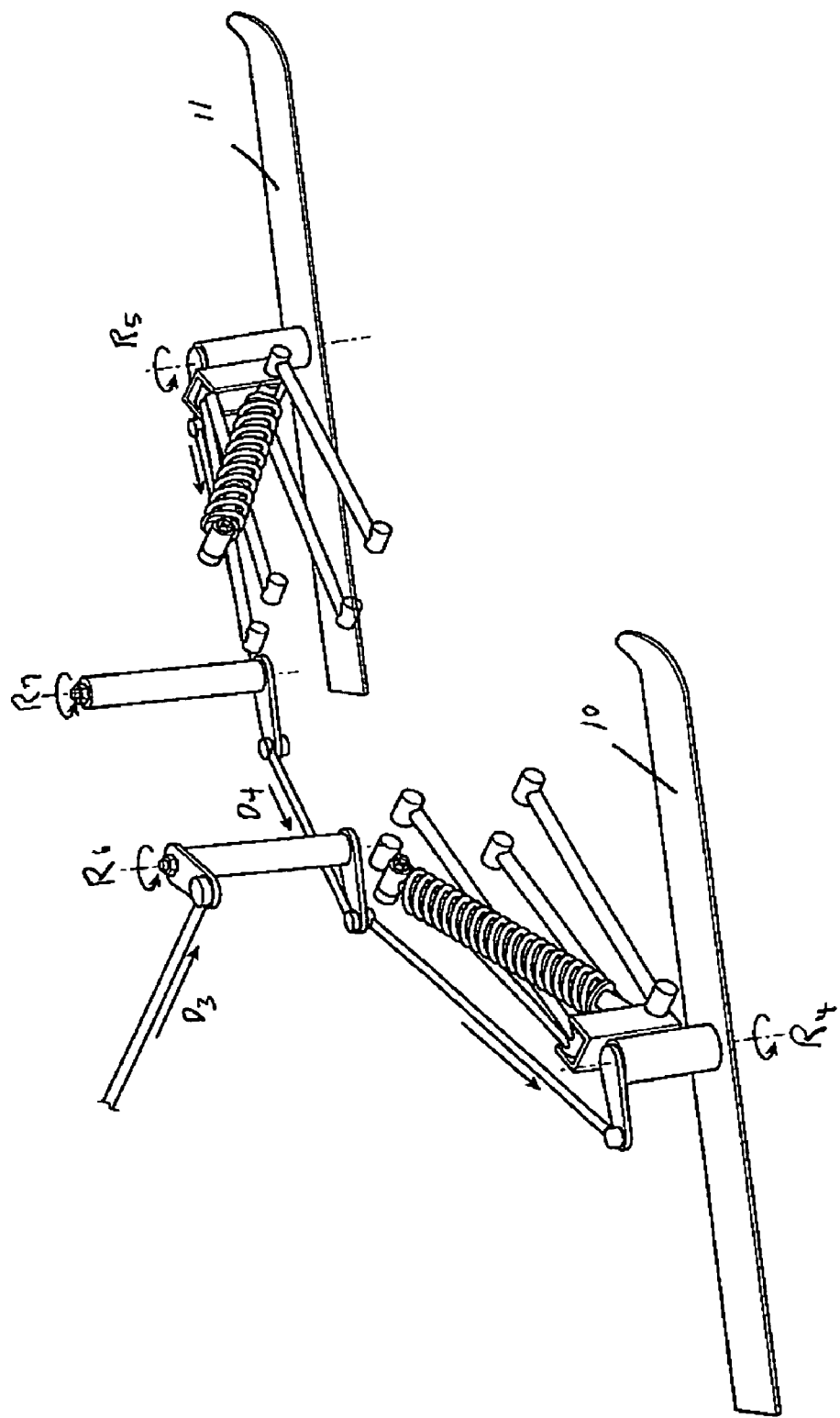
FIG. 3 is similar schematic perspective view to FIG. 2 illustrated as prior art to the present invention.
Figure 4:
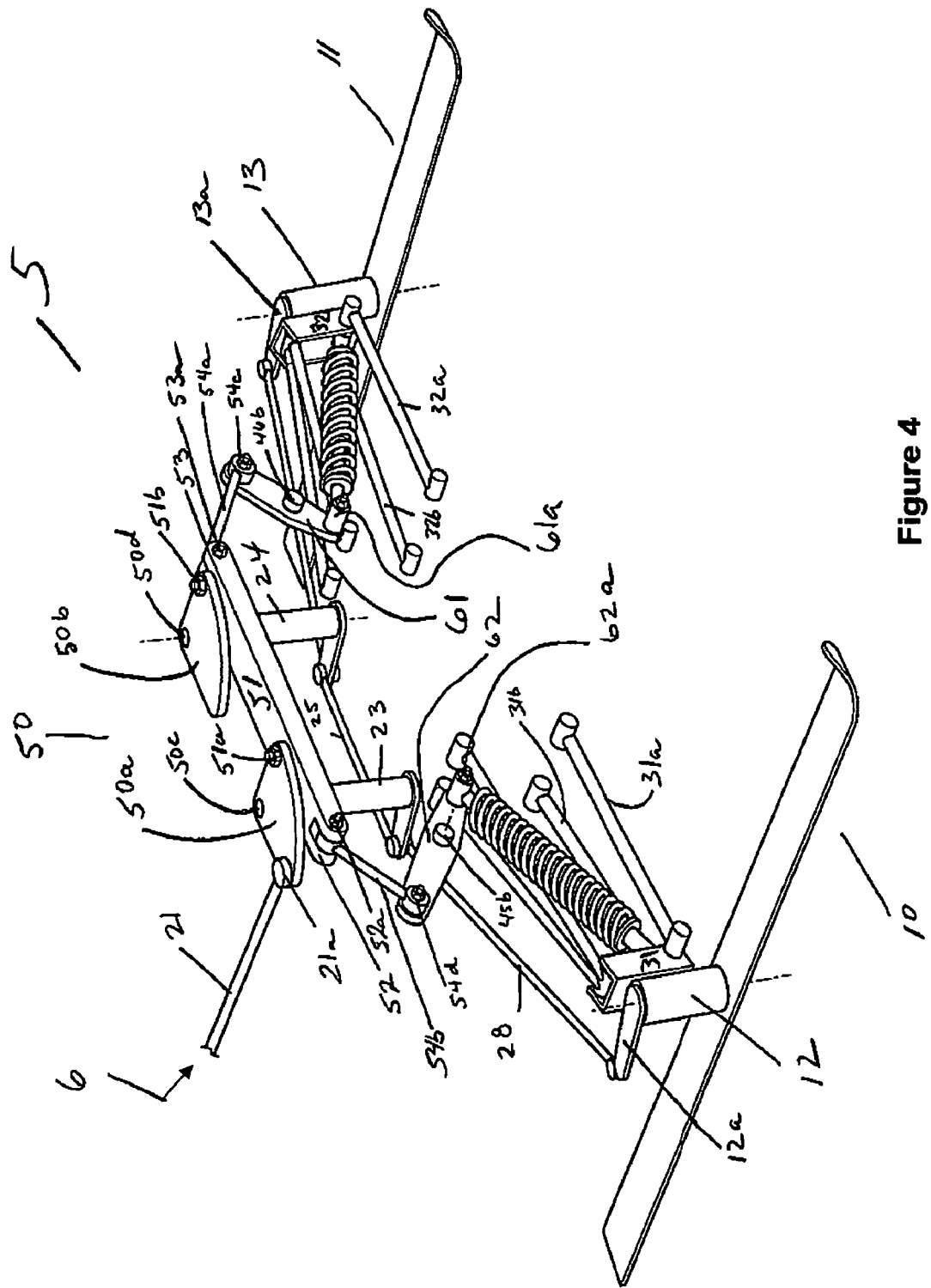
FIG. 4 is an illustration of the present invention incorporated in the suspension and steering mechanism of FIG. 1 illustrated in one embodiment of the invention.

Referring to FIGS. 1, 2 and 3 as illustrated in schematic perspective, the steering and suspension of an Arctic Cat® sled which includes two skis 10 and 11. Each ski has an upward extending steering spindle 12 and 13 engaged therewith proximate the center of the ski and further includes a suspension engaging part 31 and 32 for each spindle. A concentric spring and shock absorber 40 and 45 and 41 and 46 are engaged with the members 32 and 31 proximate one end of the shock and spring assembly and are engaged with the frame proximate mounting part 45B and 46B respectively. Each member 31 and 32 also includes members of 31a and 33b, 33a and 33b which are engaged with the frame proximate one side of the assembly and 32b, 32a, 34a and 34b which are also engaged with the frame proximate pin like portions 34d, 34c, 32b and 32c respectively. The crank member 13a and 12a is connected with steering spindle 12 and 13 which is also engaged at the other end thereof at pin 29a and 28a to a steering link 28 and 29 which extends to pins 25a, 25b of a second crank portion engaged with the upright steering pivots 23 and 24. The action of the steering pivots 23 and 24 are synchronized with synchronizing bar 25 extending between the points 25a and 25b. The top of steering pivot 24 is free wheeling and the top of steering pivot 23 is engaged with a third crank 22 at the top thereof which engages a steering link 21 at pin 21a which extends back to the steering mechanism. The steering mechanism 6 thereof is operable by user to enable the sled 5 to negotiate turns and traverse rough terrain as would a typical snowmobile, the details of which having bearing on the present invention.

Figure 5:
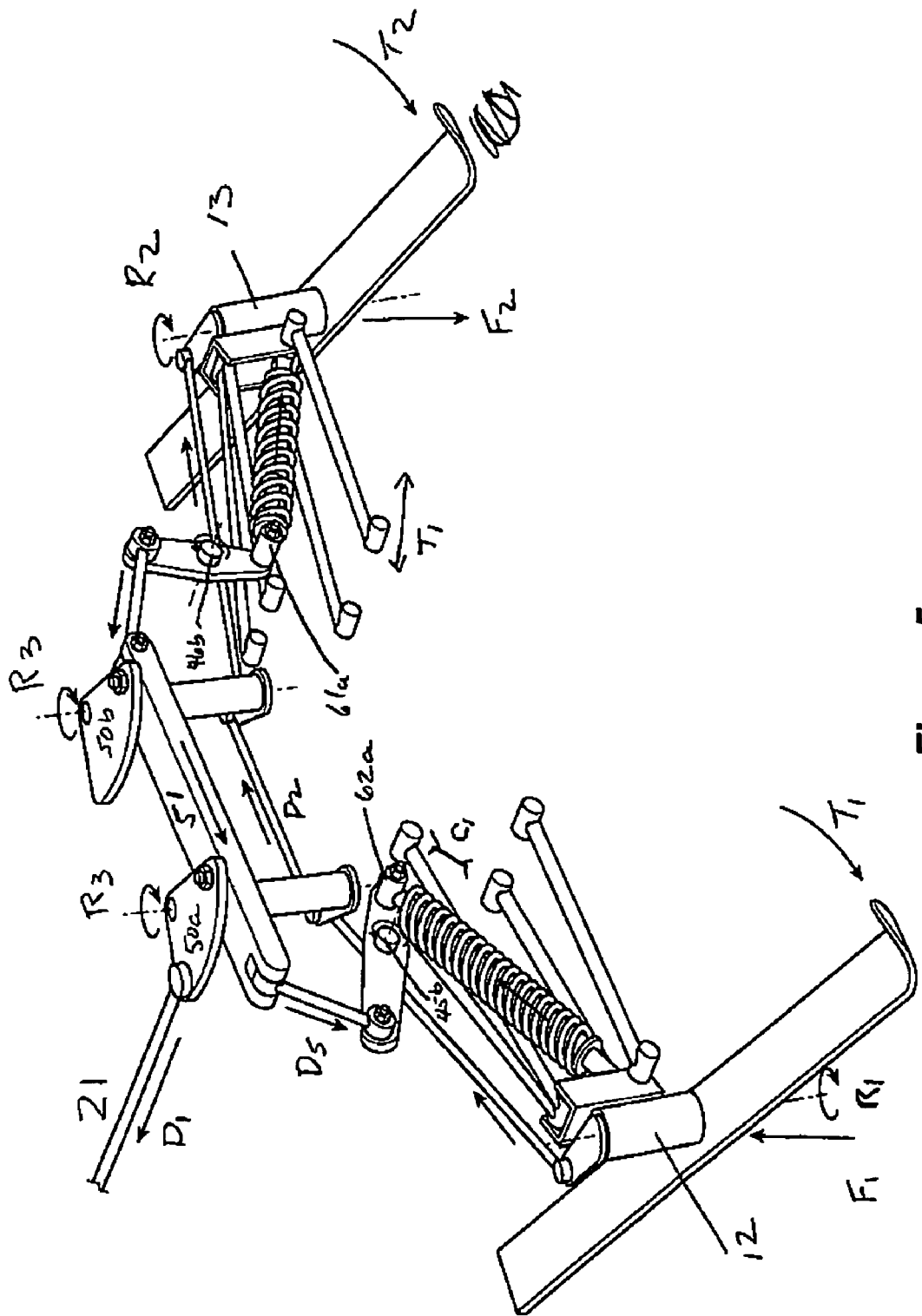
FIG. 5 is schematic perspective view illustrating the steering action of the snowmobile suspension and steering illustrated in FIG. 4.
Figure 6:
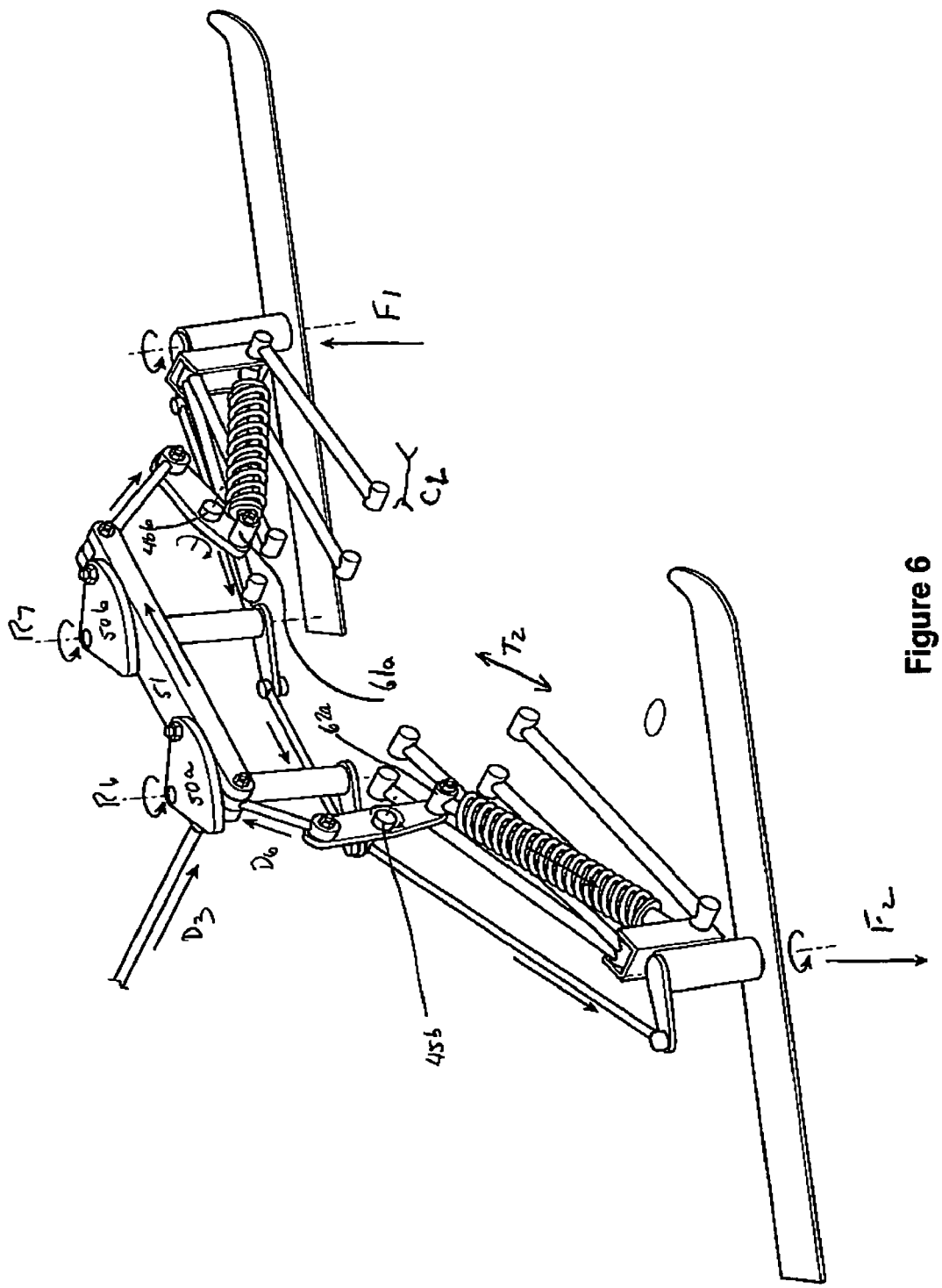
FIG. 6 is similar schematic perspective view to that of FIG. 5 illustrating the steering action of the snowmobile incorporating the present invention and the advantages thereof.
Figure 7:
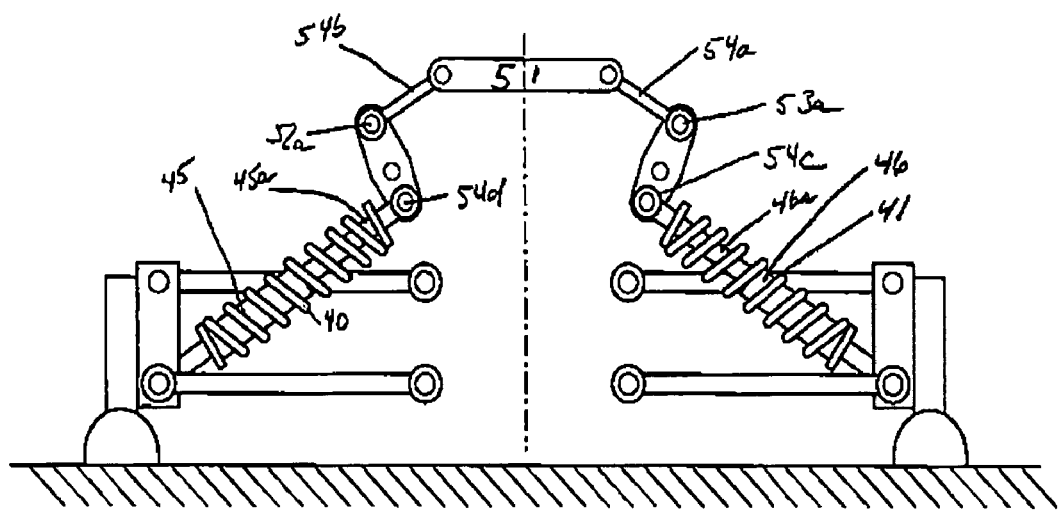
FIGS. 7 and 8 are front schematic illustrations showing the manner in which the pressure on the outside and inside ski is changed by the installation of the kit of the present invention illustrated in a preferred embodiment of the invention.
Figure 8:
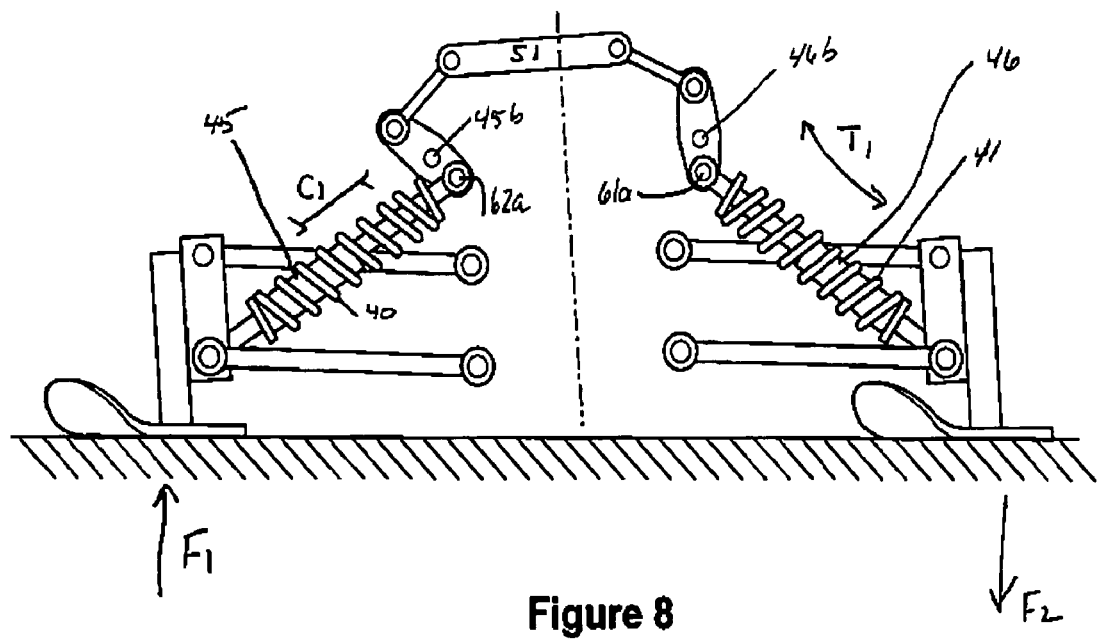

Referring now to FIGS. 4, 5, 6, 7 and 8 there is illustrated the same snowmobile 5 having the same mechanism 6 but having installed therein the kit of components to modify the steering and suspension of the present Arctic Cat® snowmobile to provide a higher pressure on the outside ski when the snowmobile negotiates a turn then on the inside ski and causing the snowmobile to automatically lean into that turn. This is accomplished by connecting a pair of sectors 50*a* and 50*b* to the steering assembly and particularly directly to sector 50*a* proximate the pin 21*a* where in steering rod 21 is connected directly to the sector 50*a*. The sector 50*a* is also attached to the vertical pivot post 23 proximate point 50*c*. A steering synchronizing member 51 is also attached to the sector 50*a* proximate connection 51 a. Synchronizing member 51 is also engaged with sector 50*b* proximate point 51*b* which thereby allows the action of the steering link 21 to be imparted to both sector 50*a* and 50*b*. Sector 50*b* is also attached to the vertical pivot post 24 proximate point 50*b*. Synchronizing member 51 has fastening points 52*b* and 53*a* at ends 52 and 53 respectively to interconnect at point 52*a* and 53*a* to a link member 54*b* and 54*a* respectively as illustrated wherein each link is attached to a crank member 62 and 61 at fastening points 54*d* and 54*c*.Each crank is therefore mounted to the points 45*b* and 46*b* which has been previously utilized to mount the upper mounting of the concentric spring and shock members which are now located at the opposite end of the crank at point 62*a* and 61*a*. The steering links 28 will extend to the steering spindles as previously shown in relation to FIGS. 1 to 3 the use of which having not changed in relation to the assembly. However the upper end of the shock and spring mount have been offset from the frame mounting parts 45*b*, 46*b* previously utilized to mount the upper ends of the shocks so that the steering action will also involve the shock and spring assembly which as was the case before extending down to the spindle framing parts 31 and 32. The upper mounting part for the suspension members therefore are offset from their prior mounting locations a predetermined amount for the operation of the steering link 21 by the operator handle which will cause rotation, as shown in FIGS. 5 and 6, of the sectors in the directions $R_3$ resulting in the links 54*a* and b moving in the direction D5 shown causing the crank member to rotate in the direction D5 proximate the upper end thereof and to rotate upper shock absorbing mount 62*a* and 61*a* in a opposite direction to cause the spring and shock members to be compressed by a force C1 or to be tensed by a forced T1 resulting in a higher force F2 on ski 11 then on ski 10. This will therefore result in an automatic leaning of the snowmobile into the turn to improve the snowmobiles negotiation of any turn. The kit of components therefore as described above therefore provides automatic leaning and resulting higher pressure on the outside ski of a negotiated turn. When the ski steering mechanism is operated in the opposite direction as shown in FIG. 6, the opposite will be true with tensile force T2 and a compressor force of C2 being the net result on the spring assembly on skis 10 and 11 respectively.

By providing the sector 50*a* and 50*b*, the synchronizing member 51, the pair of links 54*b* and 54*a*, the cranks 61 and 62, and the offset of the mounting of a shock absorber upper mount at 62*a* and 61*a* the suspension mechanism has been incorporated in the steering assembly for the reasons and purposes set out above. The sled may be manufactured with the kit components comprising the above mentioned members for the same purposes to provide the pressure difference on the inside and outside skis when the snowmobile is negotiating a turn. Alternatively the kit of components may be sold to convert a typical manufacture snowmobile to provide this improvement to the suspension and steering action of the snowmobile. The kit of components does not have to, in all embodiment of the invention, include all of the members described above in the description of the drawings but may include any components which realize the resulting definitions claims found of the invention found in the claim set. This will vary from manufacturer to manufacturer.

The kit of components may be utilized for OEM snowmobiles or as a kit of components to convert an existing snowmobile, provided as examples only, to incorporate the invention as described herein. Typical manufactures which are popular include Polaris, Bombardier, and Yamaha or the like. By incorporating the invention into these units this will allow for higher speed when the snowmobile negotiates turns or corners. Similarly the invention is not limited to a steering and suspension for snowmobiles only but may be adapted for automobiles, trucks, all terrain vehicles and other four wheel vehicles and thereby realizes the same advantages.

As many changes can be made to the preferred embodiment of the invention without departing from the scope thereof; it is intended that all matter contained herein be considered illustrative of the invention and not in a limiting sense.

The invention claimed is:

1. A snowmobile having a steering mechanism and a suspension, said suspension having a shock absorber and spring associated with each ski of said snowmobile, said steering mechanism being operably connected to a linkage system for synchronized engagement with a steering spindle located on each ski and to provide a steering motion of each ski about a pivot point connected to said spindle when the steering mechanism is operated from side to side, the suspension being conventionally attached to a frame support of said snowmobile to provide for suspension of said snowmobile as it traverses rough terrain;

the improvement comprising adaptation of said steering mechanism to include the suspension in the steering action of said snowmobile thereby including not only the steering motion of said skis when the steering mechanism is operated but also imparting a vertical element to the motion of said skis during steering, while maintaining the normal suspension characteristics of the snowmobile, said improvement being most evident when turning the snowmobile in a predetermined direction wherein when the snowmobile enters a turn the resulting pressure on the outside ski is higher in magnitude than on the inside ski causing the snowmobile to automatically lean into a turn improving the ability of the snowmobile to enter and exit turns in comparison to a snowmobile without the inclusion of the suspension in the steering action of the snowmobile, wherein said adaptation of said steering mechanism includes pivoting and supporting, for each of said skies, a rotatable link from said frame support conventionally used to mount a shock absorber and spring, said rotatable link for each of said skies for mounting the upper mount of said shock absorber and spring associated with each of said skies a predetermined distance from said frame support, wherein the resulting motion of each of said rotatable links during steering action as the snowmobile enters and exits turns will move the upper mount of said shock absorber and spring associated with each ski sufficiently to effect a tensile force on the outside shock and spring and similarly a compressive force on the inside shock and spring and thereby place higher pressure on the outside ski than on the inside ski, said adaptation also comprising:

(i) a sector for attachment to a vertical steering pivot post of each ski, said sectors for imparting the steering action to the skis; and (ii) a synchronizing member for co-ordinating the steering action of the skis, one of said sectors being adapted to connect with a steering link of said snowmobile, each of said rotatable links comprising a pivoting link and a crank, each of said pivoting links being adapted at one end to be attachable to said synchronizing member, the other end of each of said pivoting links being adapted to engage said crank associated with each of said pivoting links, each of said cranks being adapted to be pivotably mounted to said frame support, one end of each of said cranks being adapted to engage said pivoting link associated with said crank, the other end of each of said cranks opposite the pivoting link associated with each crank being adapted to be connected to the upper mount of said shock absorber associated with said ski wherein pressure differences exist between the inside and outside skis when the snowmobile is negotiating a turn.

2. The invention of claim 1 wherein said steering mechanism is an operator accessible handle.

3. A snowmobile steering mechanism adapted to place higher pressure on the outside ski than on the inside ski of said snowmobile when the snowmobile enters and exits turns, said steering mechanism being adapted to include the suspension in the steering action of the snowmobile causing the snowmobile to automatically lean into a turn improving the ability of the snowmobile to enter and exit turns in comparison to a snowmobile without the inclusion of the suspension in the steering action of the snowmobile, said suspension having a shock absorber and spring associated with each ski of said snowmobile, wherein said adaptation of said steering mechanism includes pivoting and supporting, for each of said skies, a rotatable link from said frame support conventionally used to mount a shock absorber and spring, said rotatable link for each of said skies for mounting the upper mount of said shock absorber and spring associated with each of said skies a predetermined distance from said frame support, wherein the resulting motion of each of said rotatable links during steering action as the snowmobile enters and exits turns will move the upper mount of said shock absorber and spring associated with each ski sufficiently to effect a tensile force on the outside shock and spring and similarly a compressive force on the inside shock and spring and thereby place higher pressure on the outside ski than on the inside ski, said adaptation also comprising:

(i) a sector for attachment to a vertical steering pivot post of each ski, said sectors for imparting the steering action to the skis; and (ii) a synchronizing member for co-ordinating the steering action of the skis, one of said sectors being adapted to connect with a steering link of said snowmobile, each of said rotatable links comprising a pivoting link and a crank, each of said pivoting links being adapted at one end to be attachable to said synchronizing member, the other end of each of said pivoting links being adapted to engage said crank associated with each of said pivoting links, each of said cranks being adapted to be pivotably mounted to said frame support, one end of each of said cranks being adapted to engage said pivoting link associated with said crank, the other end of each of said cranks opposite the pivoting link associated with each crank being adapted to be connected to the upper mount of said shock absorber associated with said ski wherein pressure differences exist between the inside and outside skis when the snowmobile is negotiating a turn.

4. A kit of components to modify a snowmobile steering mechanism to place higher pressure on the outside ski than on the inside ski when the snowmobile enters and exits turns, said steering mechanism being adapted to include the suspension in the steering action of the snowmobile causing the snowmobile to automatically lean into a turn improving the ability of the snowmobile to enter and exit turns in comparison to a snowmobile without the inclusion of the suspension in the steering action of the snowmobile, said suspension having a shock absorber and spring associated with each ski of said snowmobile, said kit of components for adaptation of said snowmobile steering mechanism, said adaptation of said steering mechanism includes pivoting and supporting, for each of said skies, a rotatable link from said frame support conventionally used to mount a shock absorber and spring, said rotatable link for each of said skies for mounting the upper mount of said shock absorber and spring associated with each of said skies a predetermined distance from said frame support, wherein the resulting motion of each of said rotatable links during steering action as the snowmobile enters and exits turns will move the upper mount of said shock absorber and spring associated with each ski sufficiently to effect a tensile force on the outside shock and spring and similarly a compressive force on the inside shock and spring and thereby place higher pressure on the outside ski than on the inside ski, said adaptation also comprising:

(i) a sector for attachment to a vertical steering pivot post of each ski, said sectors for imparting the steering action to the skis; and (ii) a synchronizing member for co-ordinating the steering action of the skis, one of said sectors being adapted to connect with a steering link of said snowmobile, each of said rotatable links comprising a pivoting link and a crank each of said pivoting links being adapted at one end to be attachable to said synchronizing member, the other end of each of said pivoting links being adapted to engage said crank associated with each of said pivoting links, each of said cranks being adapted to be pivotably mounted to said frame support, one end of each of said cranks being adapted to engage said pivoting link associated with said crank, the other end of each of said cranks opposite the pivoting link associated with each crank being adapted to be connected to the upper mount of said shock absorber associated with said ski wherein the installation of said kit of components provides for pressure differences on the inside and outside skis when the snowmobile is negotiating a turn.

* * * * *